July 8, 1969  R. A. DOMIN  3,454,374
METHOD OF FORMING PRESOLDERING COMPONENTS AND COMPOSITE
PRESOLDERING COMPONENTS MADE THEREBY
Filed May 13, 1966

Robert A. Domin
INVENTOR.

BY *Clarence A. O'Brien*
*and Harvey B. Jackson*
Attorneys

United States Patent Office 3,454,374
Patented July 8, 1969

3,454,374
METHOD OF FORMING PRESOLDERING COMPONENTS AND COMPOSITE PRESOLDERING COMPONENTS MADE THEREBY
Robert A. Domin, Monroeville, Pa., assignor to Youngwood Electronic Metals, Inc., a corporation of Pennsylvania
Filed May 13, 1966, Ser. No. 550,046
Int. Cl. B23k *35/14, 35/20, 35/24*
U.S. Cl. 29—183.5                              5 Claims

ABSTRACT OF THE DISCLOSURE

A pre-tinned joining member comprising a base member and a plurality of discrete soldering component coatings deposited successively thereon, the coatings comprising nickel, lead, silver and indium applied in the order named to the base member.

---

The invention relates to a method of forming a semi-finished base member useful as an article of manufacture in fabricating or assembling other products therefrom. More particularly, the base member is joined as by soldering or fusing to adjacent components of the assembly without the necessity of utilizing additional amounts of soldering alloy. The invention thus relates to a method of providing a metal article wherein the components of the soldering alloy necessary to join the article in an assembly are pre-affixed permanently and protectively in a novel manner to the base member.

In the semi-conductor industry, metallic discs, shapes or other forms of molybdenum, silicon, germanium or the like are commonly used as part of the semi-conductor device. Such discs, shapes or forms usually are very small being in the order of ⅜ inch in diameter and about 1/100 inch in thickness, and must be bonded as by soldering, for example, to other components to form the semi-conductor device. In the past, it has been the practice to add the soldering alloy in either the melted or unmelted state to the heated surfaces of the assembly or to supply the soldering alloy as discrete thin washers or wafers of the alloy to the interfaces to be joined followed by heating of the entire assembly.

The small size of these semi-conductor components makes assembly by such methods rather difficult and time consuming. Further difficulties arise from the fact that the base members and the discs or wafers of solder alloy frequently become contaminated either prior to or during assembly and, therefore, a complete and true or maximum metallurgical bond theoretically possible is not attained. This adversely affects the electrical property of the semi-conductor device in addition to its detrimental effect with regard to other physical and mechanical properties normally required in such a semi-conductor device.

Other problems arise in using base members fabricated of molybdenum due to the re-crystallization characteristic of molybdenum. As a result, specific protective measures are furnished by the present invention to combat the effects of such re-crystallization and a composite soldering alloy has been found which is compatible with the metal in its re-crystallized state.

Although the invention relates primarily to a base member formed of molybdenum, the method of the invention can be employed for "pre-tinning" other metallic members to be joined and is particularly useful where discrete members are to be soldered simultaneously to both sides of the "pre-tinned" base member.

Briefly, the invention relates to the making of brazed or soldered joints by applying one or more metallic coatings upon one or both sides of the surfaces of the base to be joined to another component. Of course, when both sides of a base member are to be joined respectively to adjacent members, the coatings contemplated herein can be applied simultaneously to both sides by the method of the invention. The aforementioned coatings, when the assembly such as a semi-conductor is heated, fuse to form a soldering alloy which adheres to the metallic surfaces of the coated base member and the adjacent assembly parts whereby and upon solidification the alloy thus formed bonds the surfaces.

The coated components of the soldering alloy which results during subsequent heating thereof, prior to such heating, also serve as protective coatings during storing and handling prior to and during assembly of the base member to other parts of the device.

The term "soldering" is used herein in its generic sense and is intended to include such processes as soft soldering, hand soldering, silver soldering, brazing, tinning and the like. In this specification the terms "soldering" and "soldering alloys" are also intended to include the corresponding alloys used in the foregoing processes.

It is essential, in order to produce a good soldered joint, that the soldering alloy adhere well and uniformly to the metallic surfaces to be joined. This is accomplished only if the molten soldering alloy comes into intimate contact or thoroughly wets the surfaces to which it is applied for the purpose of joining them. If the metallic surfaces to be joined are contaminated with foreign materials such as oil, grease, oxides and/or other metallic or non-metallic surface contaminants, the soldering alloy will not effectively wet the metal and the resultant joint will be structurally weak and, in the case of semi-conductor devices, exhibit undesirable electrical and other physical properties.

By the present invention, it is contemplated, particularly when joining dissimilar metallic surfaces, that the more easily contaminated surface or that surface which is less readily wettable with the soldering alloy, be precoated with successive layers of the component metals forming a resultant soldering alloy when the layers are subsequently fused. These component layers can be coated upon the individual parts or upon a sheet of the base material from which the items to be joined can be later stamped, coined, or otherwise separated from the sheet for subsequent assembly. Thus, a readily corrodible or easily contaminated base material can be fully protected by coatings of soldering alloy components which are much less readily corrodible or contaminable. Moreover, such protection is effective from the time of manufacture of the sheet of base material, if the aforesaid coatings are applied immediately, through its fabrication into pre-assembly components and during final assembly of the device utilizing the components. Furthermore, the first of the component solder coatings is selected from the one of two or more components of the resultant soldering alloy which will most readily bond to the metallic surface of the base member in question. The method of the invention is particularly advantageous in that the first or subsequent coatings need not necessarily be applied to the more difficult metallic surface of the base member by heating or fusion as in the normal soldering process. Instead, the coatings are applied by any suitable process which will promote good adhesion such as chemical or electrical plating, vapor deposition, plasma spraying or the like.

These and other objects, features, and advantages of the invention will be elaborated upon during the forthcoming description of illustrative forms of the invention, when taken in conjunction with the accompanying drawing wherein.

Figure 1:
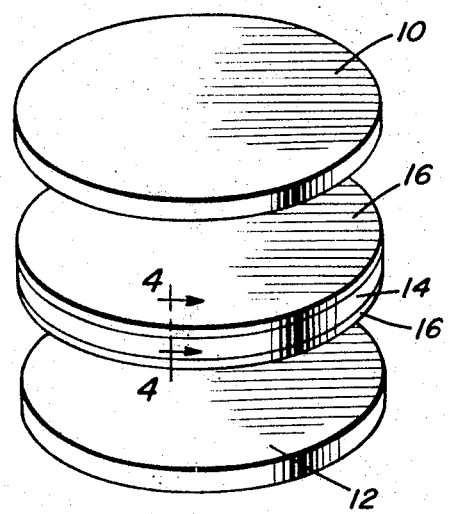
FIGURE 1 is an exploded view of a typical semi-conductive device subassembly employing as one component thereof one of the composite base members furnished by the invention.

Referring now more particularly to the drawings, the illustrative form of the invention shown in FIGURE 1 includes upper and lower typical discoidal backing members 10 and 12 which can serve as electrodes of a semiconductive device in one exemplary application of the invention. Instead between the backing members 10 and 12 is a composite base member 14 of similar configuration having coated on each side thereof a plurality of soldering component coatings with all of the coatings on a given side of the composite member being identified by a single reference character 16. Additional components of the semi-conductive device or the like can be jointed to the outwardly facing surfaces of the backing members 10 and 12, when required, as by soldering in accordance with the present invention or by other means.

Figure 2:
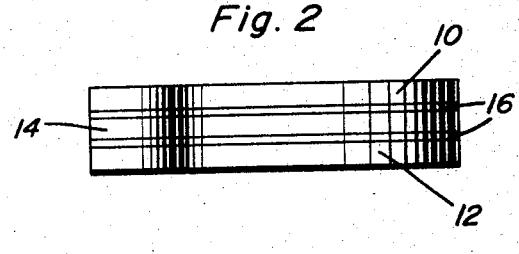
FIGURE 2 is an elevational view of a subassembly corresponding to the exploded view of FIGURE 1.
Figure 4:
FIGURE 4 is an enlarged sectional view taken substantially along the line 4—4 of FIGURE 1.

After the discoidal members 10, 12, to be joined to the coated base member 14 are assembled in their proximate positions, the over-all assembly of FIGURES 1 and 2, with or without additional components, not shown, are heated, for example, to a temperature of approximately 200° C. in a partial vacuum at a pressure of approximately 50 microns or less or alternatively in a substantially inert atmosphere such as one of argon, helium, or the like for the required time, which in the case of the embodiment of the invention disclosed herein is approximately 10 minutes, to cause all of the soldering components comprising respectively the coatings 16 to fuse and flow and thereby to form a soldering alloy, in situ, which thoroughly wets the adjacent surfaces of the backing members 10 and 12, and of course, wets both sides of the base member 14 which has been already in intimate contact with one of the component metallic coatings from which the fused soldering alloy is formed in situ.

Figure 3:
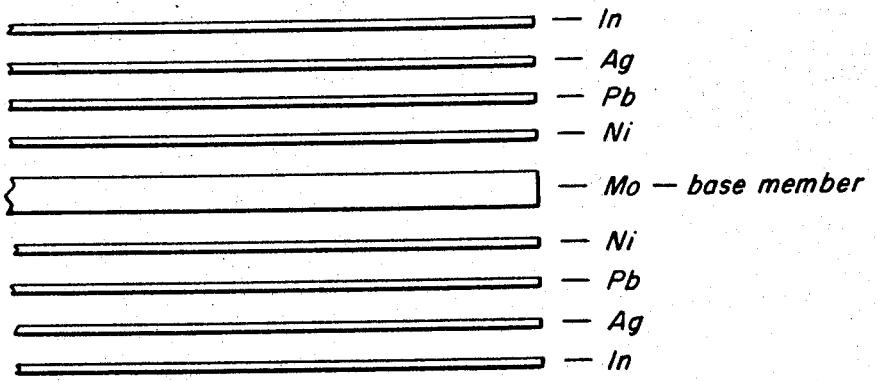
FIGURE 3 is an exploded view, in side elevation, of a portion of a sheet member coated in accordance with the invention and diagrammatically depicting the base member and its respective adhering coatings.

Referring now to FIGURE 3 of the drawing, another form of the invention, which is exemplified therein, comprises a sheet member 18, which for subsequent manufacturing or assembly processes, can be subdivided or severed into a number of discrete members, similar to member 14, for example, of FIGURES 1 and 2, by coining or stamping or the like.

For the purposes only of exemplifying the invention, sheet member 18 is denoted as being fabricated from molybdenum and elements severed therefrom may be utilized as base members or wafers forming part of a subassembly for a semi-conductive device. As noted above, however, other base metals can be employed, either ferrous or non-ferrous, to which relatively thin coatings of soldering alloy components can be effectively applied.

In this example of the invention, the intended soldering alloy is formed from three such component metals (i.e. lead, silver and indium) applied respectively and successively as discrete coatings upon each side of the molybdenum sheet member 18 which previously has been coated with nickel. Molybdenum, as a rule, is very difficult to coat satisfactorily with any material and thus the nickel of the soldering alloy is applied as the first coating because the difficulties attendant with its application are less in comparison with the remaining soldering components. Moreover, nickel can be subjected to the high temperature heating or firing step noted hereafter without adverse effect. The nickel coating is applied first inasmuch as it enhances the adhesion of the soldering alloy and acts as a barrier to minimize diffusion. The lead and silver coatings are next successively applied inasmuch as they are the more readily oxidized or contaminated of the soldering components. A final coating of indium is then applied to both sides of the coated sheet member 18, which last mentioned soldering component is sufficiently corrosion and contamination resistant under most conditions to permit storage and handling of the coated sheet member 18 without undue precautions. Also, indium is the most compatible of the three soldering alloy components, with respect to the surfaces of other articles which are adapted to be joined to the soldering alloy plated sheet member.

The sheet or base member 18, thus coated, can be stored indefinitely, or portions, such as coated base member 14, can be severed therefrom either for immediate use or for use subsequent to storage. When used, the backing members 10 and 12 or other generally uncoated members to be soldered thereto are merely stacked or otherwise engaged with the coated base 14 and the subassembly is heated in a manner as set forth heretofore to produce a fused soldering alloy which upon solidification solders the corresponding members such as 10, 14 and 12 comprising the asembly.

Typical thicknesses of the coated and uncoated base member 18 and of the component coatings are given, together with the weight percentages of the soldering alloy components, in the table. Other thicknesses of the uncoated base member may, of course, be used. Also, other thicknesses of the component coatings may be used, provided they are in the proportions necessary to provide the required weight percentages of the soldering alloy desired.

TABLE.—NICKEL, LEAD, SILVER AND INDIUM ON MOLYBDENUM BASE

| | Preferred thickness in inches | Percent in soldering alloy |
|---|---|---|
| Molybdenum | .010 | |
| Nickel | .0002 | |
| Lead | .000449 | 92.5 |
| Silver | .000013 | 2.5 |
| Indium | .000038 | 5.0 |

Plating thickness (including Ni) one side .0007000.
Both sides (including Ni) .0014000.
Total thickness of coated presoldering component .0114.

A typical coating method useful for successively applying multiple metallic coatings to a base member as depicted in FIGURE 3 of the drawings will now be specifically described. For purposes only of exemplification, the base member 18 is denoted as being molybdenum and the successive coatings thereon as nickel, lead, silver and indium, however it will be understood that the base member 18 could be a semi-conductive silicon germanium or the like.

The base member 18 is thoroughly cleaned to remove grease, oil and the like from the surface by degreasing with such solvents as are commonly used in the trade such as a Stoddart Solvent for example. The base member 18 is further cleaned of foreign matter on the surface by scrubbing with or immersion in a cleaner of the alkaline or acid type, after which it is thoroughly rinsed in water to remove any residue. A typical cleaner for the intended purpose may contain for example, approximately on the basis of weight 10 to 14 oz. trisodium phosphate, 8 to 11 oz. sodium cyanide and 0 to 1 oz. sodium carbonate per gallon of water. The base member 18 is then etched in a solution of one or more acids and then thoroughly rinsed to remove any residue. A typical etch for the intended purpose may contain, for example on the basis of volume an admixture of approximately 70 to 80% concentrated nitric acid (50–95% pure) and 20 to 30% concentrated sulfuric acid (60–98% pure). The base member is then activated in a solution of one or more acids and rinsed in water. Concentrated hydrochloric acid may, for example, be used as the activator. The base member 18 is then immersed in a nickel plating solution wherein a nickel coating of the desired thickness is applied. The nickel plating solution may be of the standard electroplating type such as Watts, fluoborate, sulfamate and the like or of the chemical reduction or immersion types. A typical plating bath which may be used for the intended purpose is one comprising on the basis of weight approximately 30 to 40 oz. nickel sulfate, 5 to 9 oz. nickel chloride and 2 to 5 oz. boric acid per gallon of water, which plating bath generally has a pH of 4.0 to 4.5. Other types of nickel coatings may be applied by such methods as vapor deposition, plasma spraying or the like. The nickel plated sheet member is then fired in a furnace to improve adhesion. Heating, for example, is carried out in a protective atmosphere such as one of hydrogen, dissociated ammonia or the like at a temperature of approximately 1700° F. for approximately 20 minutes.

The base member 18 with its nickel coating is further processed by applying the first of the soldering component coatings. The nickel coating is first activated in an acid type and/or cyanide type solution such as an aqueous 50% hydrochloric acid solution after which the activated coating is thoroughly rinsed with water.

Alternatively, the nickel coating may be activated by cathodic treatment in a solution comprising on the basis of weight, for example, 12 to 16 oz. nickel cyanide and 4 to 8 oz. potassium cyanide per gallon of water, after which treatment the composite is thoroughly rinsed with water.

The composite is immersed in lead plating solution wherein a lead coating of the desired thickness is applied. The lead plating solution may be of the standard electroplating type such as fluoborate, fluosilicate, sulfamate and the like. A typical bath which may be used for the intended purpose is one comprising, on the basis of weight, 20 to 30 oz. lead fluoroborate, 2.0 to 2.8 oz. fluoboric acid, .01 to 0.4 oz. gelatin per gallon of water.

The base member 18 now with coatings of nickel and lead is further processed by applying the second of the soldering component coatings. The lead coating is activated in an acid solution such as 50% sulfuric acid and/or alkaline solution and thoroughly rinsed with water. The composite is then immersed in a silver plating solution wherein a coating of silver of the desired thickness is applied. The silver plating solution may be of standard electroplating type such as a cyanide bath for example. A typical bath, which may be used for the intended purpose is one comprising approximately, on the basis of weight 8.9 to 10.9 oz. potassium silver cyanide, 12 to 16 oz. potassium cyanide, 3 to 12 oz. potassium carbonate and 1.2 to 1.4 oz. of proprietary brightener per gallon of water. A suitable brightener is sold under the trademark of Silvrex Brightner A by Sel-Rex Precious Metals, Inc.

The base member 18 now with coatings of nickel, lead and silver is further processed by applying the third of the soldering component coatings. The silver coating is activated in an acid and/or alkaline solution such as one, for example, containing on the basis of weight approximately 14 to 18 oz. of potassium cyanide per gallon of water and then thoroughly rinsed with water. The composite is then immersed in an indium plating bath wherein a coating of indium of the desired thickness is applied. The indium plating bath may be of the standard electroplating type such as sulfate, fluoborate, sulfamate, cyanide and the like. A typical indium plating both which may be used for the intended purpose is one comprising, on the basis of weight, approximately 2.3 to 2.5 troy ounces indium sulfate and 1.2 to 1.4 oz, sodium sulfate per gallon of water. Unless otherwise indicated the weights given are understood to be avoirdupois. Furthermore it will be understood that conventional electroplating equipment and procedures are utilized in conjunction with the typical electroplating baths set forth herein, wherein the metallic base member may be utilized as the cathode of the electroplating device.

From the foregoing, it will be seen that novel and efficient methods for the application of soldering materials to a member to be joined to other members are disclosed herein together with novel articles resulting from application of the methods. The descriptive and illustrative materials utilized herein are presented for purposes of exemplifying the invention and not in limitation thereof. Accordingly, numerous modifications of the invention will occur to those skilled in the art without departing from the spirit and scope of the invention.

What is claimed as new is as follows:

1. A pre-tinned joining member comprising a sheet member fabricated from a base material selected from the group consisting of molybdenum, silicon, and germanium, and a plurality of metallic soldering component coatings having an aggregate thickness in the order of about one-thousandth of an inch successively applied to each side of said member, said component coatings including nickel, lead, silver, and indium applied in the order named to each side of said member.

2. A pre-tinned joining member comprising a base member fabricated from molybdenum and a plurality of discrete soldering component coatings having an aggregate thickness in the order of about one-thousandth of an inch deposited successively on a surface portion of said base member said coatings including nickel, lead, silver and indium applied in the order named to said base member, said coatings when fused forming a soldering alloy, so that a joining element can be soldered to said base member surface by heating to fuse said coatings into a soldering alloy.

3. A pre-tinned joining member comprising a base member fabricated from one of the group consisting of molybdenum, silicon, and germanium, and a plurality of discrete soldering component coatings having an aggregate thickness in the order of about one-thousandth of an inch deposited successively thereon, said coatings including nickel, lead, silver, and indium applied in the order named to said base member.

4. A method of pre-tinning a sheet member for subsequent soldering of portions thereof to other joining elements, which comprises the steps of coating at least one side of said sheet member with nickel, then coating the nickel with lead, then coating the lead with silver, and thereafter coating the silver with indium, said coatings having an aggregate thickness of about one thousandth of one inch, said final coating of indium corresponding to that component of said soldering alloy most compatible to said joining elements.

5. The method of pre-tinning a joining member and soldering said member to a jointing element, which comprises the steps of coating at least one side of said joining member with nickel, then coating the nickel with lead, then coating the lead with silver, and thereafter coating the silver with indium, said coatings having an aggregate thickness of about one-thousandth of an inch, juxtaposing said joining element on the coated surface of said joining member, and heating said joining member and element to a temperature sufficient to fuse at least one of said components of said coating.

References Cited

UNITED STATES PATENTS

| | | | |
|---|---|---|---|
| 2,417,967 | 3/1947 | Booe | 29—199 X |
| 3,050,667 | 8/1962 | Emeis. | |
| 3,065,539 | 11/1962 | Hannegan. | |
| 3,159,462 | 12/1964 | Kadelburg | 29—199 X |
| 3,252,722 | 5/1966 | Allen | 29—195 X |
| 3,382,052 | 5/1968 | Clarke | 29—194 |

HYLAND BIZOT, *Primary Examiner.*

U.S. Cl. X.R.

29—195, 198, 199, 502; 117—71